United States Patent [19]

Overholt

[11] Patent Number: 4,568,714

[45] Date of Patent: Feb. 4, 1986

[54] CORRUGATING ADHESIVE COMPOSITION FOR ADHERING NORMALLY ABHERENT SURFACES

[75] Inventor: Steven D. Overholt, Egan, Minn.

[73] Assignee: Champion International Corporation, Stamford, Conn.

[21] Appl. No.: 605,464

[22] Filed: Apr. 30, 1984

[51] Int. Cl.$^4$ .................... C08L 89/00; C09D 3/06; C09J 3/06

[52] U.S. Cl. ........................................ 524/25; 524/44; 524/47; 524/52; 106/139; 156/328; 156/336

[58] Field of Search ............... 106/139, 144, 130, 213; 156/205, 210, 328, 336, 292; 524/44, 47, 18, 25, 52

[56] References Cited

U.S. PATENT DOCUMENTS

| | | | |
|---|---|---|---|
| 3,872,037 | 3/1975 | MacLeod | 524/53 |
| 3,875,101 | 4/1975 | MacLeod | 524/818 |
| 3,963,850 | 6/1976 | Doss et al. | 524/25 |
| 4,302,367 | 11/1981 | Cordes et al. | 524/25 |
| 4,539,364 | 7/1982 | Krankkala | 524/52 |

Primary Examiner—John Kight
Assistant Examiner—Nathan M. Nutter
Attorney, Agent, or Firm—Evelyn M. Sommer

[57] ABSTRACT

An aqueous starch-based corrugating adhesive containing casein, a carboxylated styrene-butadiene copolymer latex and preferably glyoxal is used to adhere liner and medium substrates having normally abherent surfaces.

3 Claims, No Drawings

CORRUGATING ADHESIVE COMPOSITION FOR ADHERING NORMALLY ABHERENT SURFACES

FIELD OF THE INVENTION

This invention relates to a starch-based corrugating adhesive. More particularly, this invention relates to an aqueous, starch-based corrugating adhesive which is capable of bonding medium or liner substrates having normally abherent surfaces, the method of bonding such surfaces, and to corrugated paperboard adhered with such adhesives.

BACKGROUND OF THE INVENTION

Starch-based adhesives have been used extensively in the production of corrugated paperboard and corrugated containers. Conventional starch-based corrugating adhesives include cooked or gelatinized starch and raw, i.e., unmodified starch particles. The cooked starch functions as a carrier and serves to suspend the unmodified starch granules. The pH of such adhesives is 10.0 or greater, preferably 12.0, in order to reduce the gelation temperature of the raw starch. Typically, borax is included to speed gelation. Gelation, along with the interaction of borax, caustic, and carrier, causes the compositions to function as adhesives upon heating during the corrugation process. The high pH and subsequent solubilization of the unmodified starch after heating result in the poor water resistance of conventional starch adhesives.

U.S. Pat. No. 4,339,364 to Krankkala discloses an aqueous starch-based adhesive comprising starch, a carboxylated styrene-butadiene latex, thickener and a cross-linking agent. The resulting adhesive has excellent water-resistance and has been proposed for use in the same applications and storage systems with conventional starch adhesives. However, as the given pH range at which this adhesive is to be used is 4.5–7.0, there results a high gelation temperature and also it is necessary that the starch mixing equipment be flushed free of any conventional caustic adhesive before this adhesive can be prepared.

Further, prior starch-based corrugating adhesives, including those described in the Krankkala patent cannot be used to bond liner or medium substrates when such substrates have normally abherent contact surfaces at the points where the liner and medium are to be adhered. Thus, if the medium or liner surface is impregnated with a material, such as a waxy or a resinous material, or if the surface otherwise has a low porosity possibly due to the presence of a coating or impregnating material rendering it substantially abherent to conventional or high amylose starch carrier corrugating adhesives at the points of contact, conventional or high amylose starch carrier corrugating adhesives are unsuitable and this is particularly true in the production of the single face bond.

An adhesive composition in accordance with the invention was compared in the laboratory with a conventional corrugating adhesive and also with an adhesive as disclosed in the Krankkala patent with regard to its ability to bond to liner which had been coated with a resin which caused the liner to be highly abherent to conventional or high amylose starch carrier corrugating adhesives and which furthermore had a very low porosity. In these tests, the adhesives were applied to the flute tips of 4"×6" pieces of single faced board, then brought into contact with the abherent liner and then heated on a 350° F. hot plate in the conventional manner for simulation of the double face bonding process. A 7 pound weight was applied for 6 seconds. The bonds were then pulled apart at different predetermined times and the time required for fiber tear to develop noted. Fiber tear required only 4–6 seconds with the adhesive of this disclosure. Fifteen to twenty seconds were required for the adhesive of the Krankkala patent. Fiber tear never did develop with the conventional or high amylose starch carrier corrugating adhesives.

It was also found that a highly abherent liner which could only be run at 80–120 fpm on a corrugator single facer using high amylose starch carrier adhesives and only 200–300 fpm using the Krankkala adhesive and other specialty adhesives could be run at speeds of 600 fpm when using an adhesive of the present invention. This is thought to derive from the unique properties imparted to the adhesive of the present invention by the interaction of the casein with the carboxylated styrene-butadiene latex.

SUMMARY OF THE INVENTION

It has now been found that by incorporating a protein, such as casein, into a starch-based corrugating adhesive also containing a carboxylated styrene-butadiene copolymer, the adhesive can be employed successfully to bond normally abherent surfaced liner and medium substrates not ordinarily bondable with conventional or high amylose starch carrier corrugating adhesives, or other adhesives such as those described in U.S. Pat. No. 4,339,364.

According to the present invention, there is provided an aqueous starch-based adhesive which comprises in admixture: (a) water; (b) corn starch and/or wheat starch; (c) casein; (d) a carboxylated styrene-butadiene copolymer latex; (e) an alkali; and (f) borax.

According to a preferred embodiment of the present invention, a minor amount of a crosslinker such as, for example, glyoxal is included in the adhesive admixture to further increase water resistance of the adhesive bond.

The resulting starch-based corrugating adhesives of the present invention are capable of bonding liner and medium substrates much more strongly than conventional starch-based corrugating adhesives, particularly when the liner or medium substrates have normally abherent surfaces because of, for example, coatings, wax impregnation or low porosity in general.

The corrugating adhesive of the present invention not only possesses increased ability to bond coated surfaces or surfaces of low porosity, but possesses increased initial tack on such surfaces, as well as increased adhesive strength along with greater water resistance as compared with conventional corrugating adhesives, and also as compared with the adhesive given in the Krankkala patent.

DETAILED DESCRIPTION OF THE PREFERRED EMBODIMENTS

The starch-based corrugating adhesive of the present invention preferably comprises (a) water; (b) corn and/or wheat starch, a portion of which may be cooked; (c) casein; (d) a carboxylated styrene-butadiene copolymer latex; (e) an alkali; (f) borax; (g) a viscosity increasing agent; and (h) a cross-linker such as, for example, glyoxal.

The corrugating adhesive of the present invention may contain water in an amount of from about 25 to about 70 weight percent, preferably from about 40 to about 60 weight percent based upon the total weight of the adhesive composition. The starch can be modified or unmodified corn and/or wheat starch, and a portion of the starch may be cooked. The raw wheat and/or corn starch should be used in an amount of between 8 and about 35 weight percent preferably 12 to 25 weight percent starch solids. If cooked wheat and/or corn starch is included, the amount of such cooked starch should be present in an amount of from about 1 to about 8 weight percent, preferably from about 1.5 to about 6 weight percent starch solids.

Other suitable proteins can be incorporated into the adhesive of the present invention so as to provide the ability of the present adhesive to bond coated surfaces or surfaces having low porosity. Another example of a suitable protein for including in the adhesive of the invention is soy protein. The preferred protein is casein which is used in an amount of between 0.5 and about 8 weight percent, preferably from about 1 to about 5 weight percent of the adhesive composition.

In an especially preferred embodiment of the present invention, casein is used in combination with glyoxal to provide increased wet strength and improved bondability as a corrugating adhesive for bonding coated surfaces and surfaces of low porosity. When used in combination with casein, suitable amounts of glyoxal include from about 0.5 to about 2 weight percent glyoxal, preferably from 0.5 to about 1 weight percent glyoxal. An especially preferred adhesive composition of the present invention includes from about 0.8 to about 2.5 weight percent casein and about 0.5 to about 1 percent glyoxal.

The carboxylated styrene-butadiene copolymer latex of the present invention can be utilized in an amount of from about 5 to about 40 weight percent, preferably from about 15 to about 30 weight percent as a 50% solids emulsion.

Preferably, an alkali or basic material is included in the adhesive composition, such as ammonium hydroxide, sodium hydroxide, potassium hydroxide or the like, which material can be utilized in an amount of from about 0.05 to about 1.5, preferably from about 0.1 to about 1.0 weight percent.

A viscosity increasing agent or thickener can be utilized. Such materials include, for example, hydroxyethylcellulose in amounts of from about 0.05 to about 1.5 weight percent, preferably from about 0.1 to about 1.0 weight percent. Other viscosity increasing agents which may be suitably used include carboxymethylcellulose or starch hydroxyethyl ethers or other conventional thickener such as described in *Industrial Gums*, by R. L. Whistler et al; Academic Press, 1959, pages 597–740, the disclosure of which is incorporated by reference.

If desired, borax may be included in the adhesive composition. Thus, the amount utilized may be from 0 to about 1.5 weight percent, preferably from about 0.1 to about 1.0 weight percent.

The starch-based corrugating adhesive of the present invention suitably has a solids content in the range of between about 25 and about 40, preferably from about 28 to about 34 weight percent, with 33 weight percent being especially preferred.

Preferably, the present adhesive composition is prepared by first forming an aqueous admixture of water, starch, ammonia and casein, which is cooked so as to gel the starch and destroy the enzymes present in the protein. The proteinacious mixture is then cooled, and an admixture of starch, borax and alkali is admixed with the aqueous casein admixture. Next, the carboxylated styrene, butadiene copolymer latex is added to the admixture with agitation continuing until the resultant mixture has a suitable consistency.

The carboxylated styrene-butadiene polymer latex comprises an aqueous dispersion of a copolymer formed by the emulsion copolymerization of styrene and butadiene together with a small amount of an alpha, beta-ethylenically unsaturated $C_3$–$C_6$ mono or dicarboxylic acid or amide, such as acrylic or methacrylic acid or acrylamide or methacrylamide. Such carboxylated styrene-butadiene copolymer latexes are well known to the art and generally comprise a solids content of about 50 weight percent.

The resultant pH of the adhesive composition should be in the range of from about 6.5 to about 11.0, preferably from about 9.0 to about 10.0.

Following addition of the latex, glyoxal is preferably added to the admixture in the amounts previously indicated, and the mixture is blended until homogenous.

The resultant corrugating adhesive composition has a viscosity in the range of from about 300 to about 750, preferably from about 500 to about 600 centipoises as measured on a Brookfield viscosimeter at 100 rpm. The desired viscosity may be provided by either incorporating a cooked starch carrier portion or by addition of any of the above mentioned viscosity increasing agents such as hydroxyethylcellulose. The preferred manner of adjusting the viscosity to the desired level includes incorporation of cooked starch, caustic and borax in the amounts previously indicated. However, another preferred way of adjusting the viscosity to the desired level is to incorporate an alkaline activated hydroxyethylcellulose thickening agent in an amount of 0.05 to about 0.1 weight percent based upon the total weight of the adhesive.

The adhesive composition of the present invention is utilized in the production of corrugated paperboard and corrugated paperboard products, such as containers. Corrugated paperboard comprises a liner adhesively joined to the tips of a fluted medium on one or both sides thereof. The adhesive composition of the present invention may be applied to either the fluted medium or the liner, or both.

The corrugating adhesive of the present invention finds special application in the bonding of liners or mediums in which the liner and or medium has a normally abherent surface. The expression "normally abherent surface" as used in the present application means that the surface to be adhered has reduced adhesibility because it has low porosity or is coated or impregnated with a material, such as paraffin wax, or a resinous material, so that it is normally difficult to bond with conventional or high amylose starch carrier corrugating adhesives. In particular, the expression "normally abherent surface" is used to mean that the surface is at least as difficult to adhere as would be a paperboard surface impregnated with paraffin wax.

The adhesive of the present invention may be used in amounts of from about 2 to about 8 pounds per thousand square feet, preferably from about 3 to about 5 pounds per thousand square feet of liner or medium based upon the dry weight or solids weight of the adhesive.

The following examples serve to illustrate the invention. All percentages are by weight unless otherwise indicated.

EXAMPLE 1

A commercial mixer is charged with 500 lbs. of cold water and 100 lbs. of casein. The mixture is agitated for 10 minutes. Five lbs. of 26 Bé ammonium hydroxide are then added and the mixture is heated to about 180° F. and held for twenty minutes so as to solubilize the casein and destroy the enzymes present in the casein. To the mixture is added 470 lbs. cold water. Thereafter, this composition is added to a mixture containing 1550 lbs. water, 1550 lbs. corn starch, 17 lbs. hydroxyethylcellulose (commercially available as Cellosize QP-4400H from Union Carbide Corporation) and 7 lbs. 26 Bé ammonium hydroxide. The resulting mixture is agitated for fifteen minutes.

1300 lbs. of a carboxylated styrene-butadiene latex (commercially available as Dow Latex 620 from Dow Chemical Corporation) are then added to the mixture so as to provide 24 weight percent based on the total mixture. Agitation is continued for a short time until a smooth homogeneous adhesive composition is obtained. The resultant adhesive has a pH of from 7.5 to 8.0.

EXAMPLE 2

The adhesive produced in Example 1 following viscosity adjustment is applied as a corrugating adhesive to join a liner and fluted medium wherein the liner is wax or resin impregnated. The adhesive is utilized at the rate of 5.0 dry pounds per thousand square feet. The resulting bond is excellent.

EXAMPLE 3

The procedure of Example 1 is repeated with the exception that 0.8 weight percent glyoxal is added to the adhesive composition based upon the total weight of the final adhesive. When tested as a corrugating adhesive with wax or resin impregnated liner, the resulting bond had a much better water resistance than that obtained in the absence of glyoxal. In fact, the water resistance of the bond is found to be excellent.

EXAMPLE 4

A commercial mixer is charged with 1200 lbs. cold water, 125 lbs. casein, and 250 lbs. high amylose corn starch. The mixture is agitated for 10 minutes. 7 lbs of 26 Bé ammonium hydroxide are added and the mixture heated to 180° F. and stirred for 20 minutes to solubiize the casein, destroy enzymes and gelatinize the starch.

Subsequently, the following components are added into the above mixture, in the order listed, with constant agitation.

1650 lbs. Cold Water
16 lbs. Borax (5 mol)
36 lbs. 50% Caustic
1350 lbs. Dow Latex 233
300 lbs. Corn Starch
300 lbs. Wheat Starch
80 lbs. 40% Glyoxal Solution The resultant mixture is then stirred for 15 minutes.

The adhesive composition thereby obtained has a pH of 9.8 and a total solids content of 33%. The gelatinization temperature is 147°–150° F. and the viscosity is 550 cps as measured by a Brookfield viscometer at 100 rpm.

The performance of the adhesive of the present example in ability to bond to abherent surfaces is found to be as good as or better than the adhesive of Example 1.

Athough the invention has been described in considerable detail with particular reference to certain preferred embodiments thereof, variations and modifications can be effected within the spirit and scope of the invention as described hereinbefore, and as defined in the appended claims.

What is claimed is:

1. A starch-based corrugating adhesive composition comprising:
   (a) about 40 to about 60 weight percent water;
   (b) about 12 to about 25 weight percent raw corn or wheat starch and about 1.5 to about 6 weight percent cooked corn or wheat starch;
   (c) about 15 to about 30 weight percent of a carboxylated styrene-butadiene copolymer latex as a 50 weight percent solids emulsion;
   (d) about 0.8 to about 2.5 weight percent casein;
   (e) about 0.1 to about 1.0 weight percent of a thickener; and
   (f) about 0.5 to about 1.0 percent glyoxal.

2. The adhesive composition of claim 1 wherein said thickener is employed in combination with an alkaline material.

3. The adhesive composition of claim 1 wherein the thickener is selected from the group consisting of carboxymethylcellulous, hydroxyethylcellulose or starch hydroxyethyl ethers.

* * * * *